UNITED STATES PATENT OFFICE.

WALTER NEWMAN, OF BIRMINGHAM, ALABAMA.

PAINT-REMOVER.

1,330,387.      Specification of Letters Patent.     Patented Feb. 10, 1920.

No Drawing.    Application filed February 16, 1918. Serial No. 217,625.

*To all whom it may concern:*

Be it known that I, WALTER NEWMAN, a citizen of the United States of America, and resident of Birmingham, in the county of Jefferson and State of Alabama, have invented certain new and useful Improvements in Paint-Removers, of which the following is a specification.

This invention relates to compositions of the detergent type, the said invention having for its object the provision of a novel composition for removing paint, the said compound having an effect on the paint to contract the same, causing it to be loosened from the surface so that it can be readily dislodged or displaced therefrom.

The invention has been found to be particularly useful in removing "dullcoat" paint from plastered walls and the like.

A further object of this invention is to produce a composition which can be readily applied to a surface and which will act quickly, due to its penetrating qualities, thereby enabling an operator to cover a surface and at once beginning the removal of the paint.

A still further object of this invention is to produce a composition of the character indicated which will prove comparatively inexpensive to produce and use in the treatment of paint for the removal of said paint.

With the foregoing and other objects in view, the invention consists in the ingredients and in the proportions to be hereinafter more fully set forth and claimed.

In carrying the invention into practice, I mix flour, blue stone, melted glue and wood alcohol with sufficient water to make a thin paste which can be worked or applied to the painted surface by a brush, the ingredients and proportions being substantially as follows: viz:

| | |
|---|---|
| Flour | Five pounds. |
| Dissolved blue stone | One ounce. |
| Melted glue | One-half pound. |
| Wood alcohol | One pint. | the same being mixed with water sufficient to produce a thin paste, as stated.

I have found in practice that when the composition is applied to paint, contraction of the said paint results in its being dislodged and removed as hereinbefore set forth.

I claim—

The herein described composition of matter for the removal of paint from plastered walls and the like consisting of five pounds flour, one ounce dissolved blue stone, one-half pound melted glue, and one pint alcohol.

WALTER NEWMAN.